US009492029B2

(12) United States Patent
Hong et al.

(10) Patent No.: US 9,492,029 B2
(45) Date of Patent: Nov. 15, 2016

(54) SPLATTER GUARD FOR COOKING APPLIANCES AND METHOD FOR USE THEREOF

(71) Applicants: Han Dat Hong, Basel (CH); Gero Bruckmann, Lörrach (DE)

(72) Inventors: Han Dat Hong, Basel (CH); Gero Bruckmann, Lörrach (DE)

( * ) Notice: Subject to any disclaimer, the term of this patent is extended or adjusted under 35 U.S.C. 154(b) by 0 days.

(21) Appl. No.: 14/643,168

(22) Filed: Mar. 10, 2015

(65) Prior Publication Data
US 2015/0250356 A1    Sep. 10, 2015

(30) Foreign Application Priority Data

Mar. 10, 2014    (DE) .................. 20 2014 101 044

(51) Int. Cl.
*A47J 36/06*    (2006.01)
*A47J 36/02*    (2006.01)
*A47J 37/10*    (2006.01)

(52) U.S. Cl.
CPC .............. *A47J 36/022* (2013.01); *A47J 36/06* (2013.01); *A47J 37/101* (2013.01); *A47J 37/108* (2013.01)

(58) Field of Classification Search
CPC ...... A47J 36/022; A47J 36/06; A47J 37/108; A47J 37/101; A47G 21/10; A61B 2017/505; A61B 2017/301; A61B 2017/305; A61B 2017/307; A61B 17/50; A61B 17/30; A61C 3/10; B25B 9/02; A61F 2/1664; B26B 13/22; B26B 13/26; B26B 29/04; A45D 26/0066
USPC ............. 220/369, 731, 735; 294/99.2, 3, 11; 30/323; 606/210, 211
See application file for complete search history.

(56) References Cited

U.S. PATENT DOCUMENTS

| | | | | |
|---|---|---|---|---|
| 789,539 A | * | 5/1905 | Harris ................. | B25F 1/04 132/75.6 |
| 2,411,825 A | * | 11/1946 | Ferguson ............... | A61B 17/30 294/99.2 |

(Continued)

FOREIGN PATENT DOCUMENTS

| DE | 102010001163 | 7/2011 |
|---|---|---|
| DE | 202012006332 | 12/2012 |

(Continued)

OTHER PUBLICATIONS

Result of search report for German Application No. 20 2014 101 044.0 filed on Mar. 10, 2014.

*Primary Examiner* — Fenn Mathew
*Assistant Examiner* — Robert Stodola
(74) *Attorney, Agent, or Firm* — Paul D. Bianco; Katharine Davis; Fleit Gibbons Gutman Bongini & Bianco PL

(57) ABSTRACT

Splatter guard for pots, pans, and other cooking appliances, with long-handled tongs, which have two legs that can be pressed together, includes a movable tongue situated between the two legs so that the tongue is raised when the two legs are pressed together. If the two legs are pressed together, the tongue is automatically raised, at least partially, and in particular in its front area, which faces the free leg ends, to the extent that the tongue protrudes above the two legs. In this way, a clamping space is formed between the raised tongue and the two legs into which a flat splatter guard element can be inserted. If pressure is applied on the two legs when the splatter guard element has been inserted, the splatter guard goes back to its basic position in which the tongue is located, at least essentially, in one plane with the two legs. With the movement of the tongue into this basic position, the splatter guard element inserted between the tongue and the two legs is clamped between the tongue and the two legs and held there. In this position, the splatter guard can be placed on the upper edge of a pot or a pan, so that the splatter guard covers the opening of the pot or the pan with the splatter guard element inserted therein, and in this way, a splashing out of grease or liquid is prevented.

19 Claims, 3 Drawing Sheets

(56) References Cited

U.S. PATENT DOCUMENTS

| | | | |
|---|---|---|---|
| 3,858,320 A | 1/1975 | Neal et al. | |
| 4,103,420 A * | 8/1978 | Davis | A47J 43/283 294/131 |
| 4,768,288 A * | 9/1988 | Culbertson | A47G 21/02 294/131 |
| 6,115,921 A * | 9/2000 | Garneau, Sr. | B25G 3/24 30/123 |
| 6,131,977 A * | 10/2000 | Sacks | A47J 43/283 294/131 |
| 6,217,092 B1 * | 4/2001 | Spicker | A47G 21/10 294/16 |
| 2012/0152969 A1 * | 6/2012 | Ates | A47G 21/16 220/735 |
| 2013/0118275 A1 * | 5/2013 | Lafond | B25B 9/00 73/864.71 |

FOREIGN PATENT DOCUMENTS

| | | |
|---|---|---|
| DE | 202013001470 | 4/2013 |
| DE | 202012001488 | 5/2013 |
| EP | 0185969 | 7/1986 |
| GB | 2474669 | 4/2011 |

* cited by examiner

SPLATTER GUARD FOR COOKING APPLIANCES AND METHOD FOR USE THEREOF

FIELD OF THE DISCLOSURE

The disclosure concerns a splatter guard for pots, pans, and other cooking appliances.

BACKGROUND

The placing of fine screens or a lid with openings on the upper edge of the pot or the frying pan as a splatter guard for pots and pans so as to prevent grease or water from splattering during frying or cooking is known. The known splatter guard devices in the form of screens or lids with openings are, however, difficult to clean and require a lot of space when stored.

Furthermore, splatter guard devices are known from DE 20 2012 001 488 U1 and DE 20 2013 001 470 U1; they comprise a frame into which a flat, absorbent cellulose, in particular, paper towels, can be clamped in. The insertion of the flat cellulose or the paper towels, however, is very cumbersome and time-consuming.

SUMMARY OF THE DISCLOSURE

With this in mind, one aspect of the disclosure relates to a space-saving, easy-to-clean splatter guard, which can be used and handled in the simplest possible manner.

Preferred embodiments of the splatter guard are also disclosed.

The splatter guard in accordance with the disclosure has long-handled tongs with two legs, which can be pressed together, relative to one another. A movable tongue, which is raised when the two legs are pressed together, is situated between the two legs. If the two legs are pressed together, the tongue is raised automatically, at least partially, and, in particular, in its front section, which faces the free leg ends, to the extent that the tongue protrudes above the two legs. In this way, a clamping space is formed between the raised tongue and the two legs, into which a flat splatter guard element can be inserted. If pressure is then applied on the two legs with the inserted splatter guard element, the splatter guard goes back to its basic position, in which the tongue is located, at least essentially, in a plane with the two legs. With the movement of the tongue into this basic position, the splatter guard element inserted between the tongue and the two legs is clamped between the tongue and the two legs and held there.

In this position, the splatter guard in accordance with the disclosure can then be placed on the upper edge of a pot or a pan or also another cooking appliance, so that the splatter guard with the splatter guard element inserted therein covers the opening of the pot, the pan, or the cooking appliance and, in this way, a splattering of grease or liquid is prevented.

The splatter guard element, which is inserted between the two legs and the movable tongue, is appropriately a vapor-permeable and simultaneously liquid-absorbent cloth, for example, a textile cloth or a cellulose cloth, such as common paper towels.

The splatter guard in accordance with the disclosure is characterized by a simple handling and, in particular, by the simple insertion and clamping-in of the splatter guard element.

In accordance with the proper use of the splatter guard in accordance with the disclosure, the clamped-in splatter guard element can be removed from the splatter guard in a simple manner, without the user thereby coming into contact with the soiled splatter guard element. The two legs are thereby again pressed together, wherein the tongue situated between the two legs is raised and releases the clamping of the inserted splatter guard element. The inserted splatter guard element thereby falls out of the splatter guard and can, for example, be disposed of directly into a garbage can.

BRIEF DESCRIPTION OF THE DRAWINGS

These and other advantages of the splatter guard in accordance with the disclosure can be deduced from the embodiment example, described in more detail below with reference to the appended drawing. The drawings show the following.

DETAIL DESCRIPTION

Figure 1:
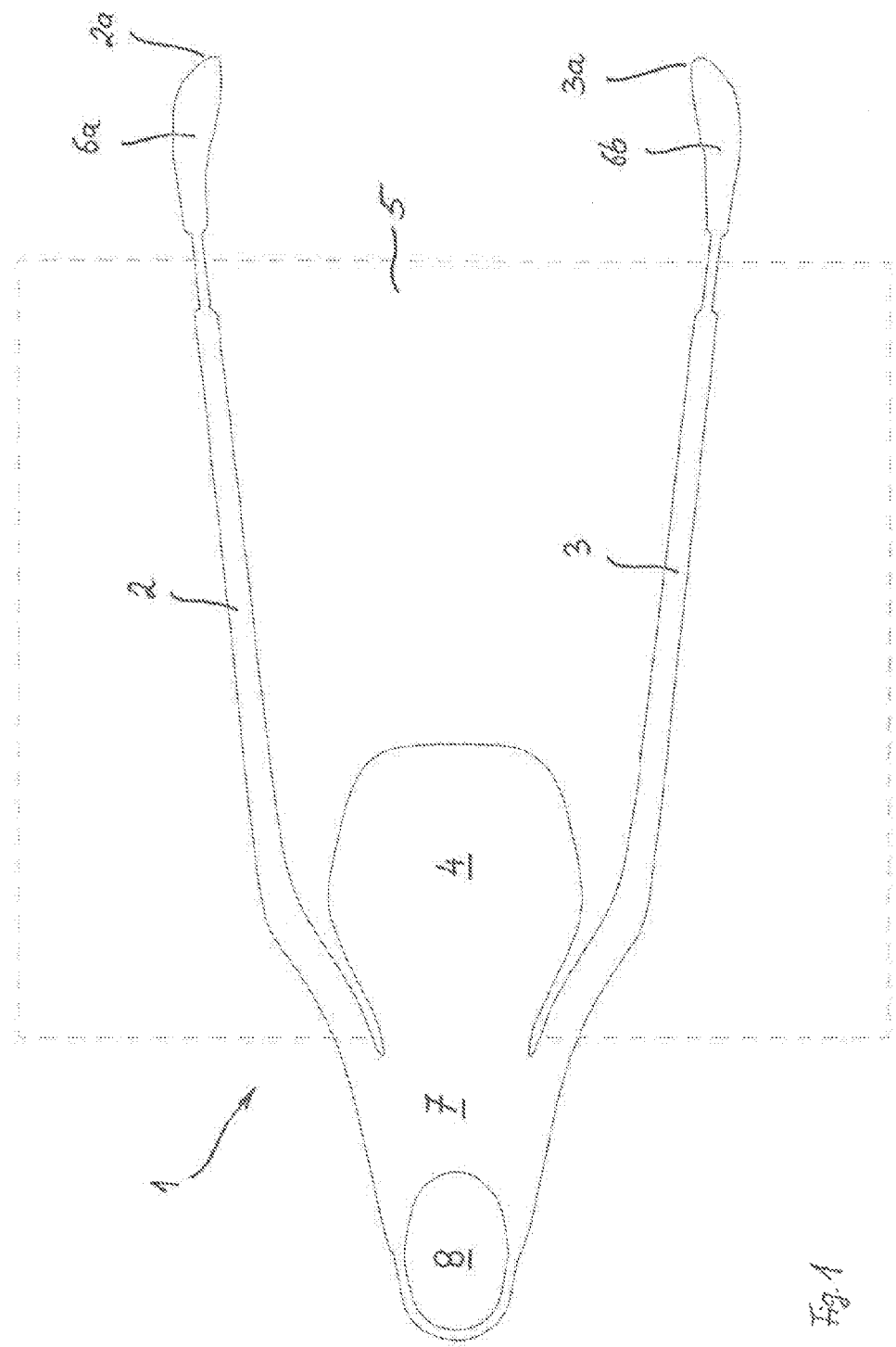
FIG. 1: Top view of a splatter guard in accordance with the disclosure in a first functioning position.

FIG. 1 shows a splatter guard in accordance with the disclosure in a top view, wherein the splatter guard is located in a first functioning position. The splatter guard comprises long-handled tongs 1 with two legs 2, 3, which can be pressed together, relative to one another. The two legs 2, 3 are appropriately formed, in one piece and elastically, on one main body 7, so that the two legs 2, 3 can be pressed together, relative to one another, preferably with a user operating it with one hand. The main body 7 is appropriately made of plastic. However, both the main body 7 and the two legs 2, 3 can also be made of metal, wherein the main body 7 and at least a part of the two legs 2, 3 are provided with a plastic coating. This prevents the surface of the long-handled tongs from being excessively heated when the splatter guard is properly placed on a hot pot or a hot pan. Appropriately, there is an eyelet 8 on the main body 7 for the hanging of the splatter guard in accordance with the disclosure on a hook; it is located on the rear end of the main body 7, which is opposite the two legs 2, 3.

A movable tongue 4 is formed between the two legs 2, 3 on the main body 7. Appropriately, the movable tongue 4 is made of the same material as the main body 7 and is formed there as one piece. The tongue 4 is thereby coupled with the two legs 2, 3 in such a way that the tongue 4 is raised when the two legs are pressed together.

Figure 2:
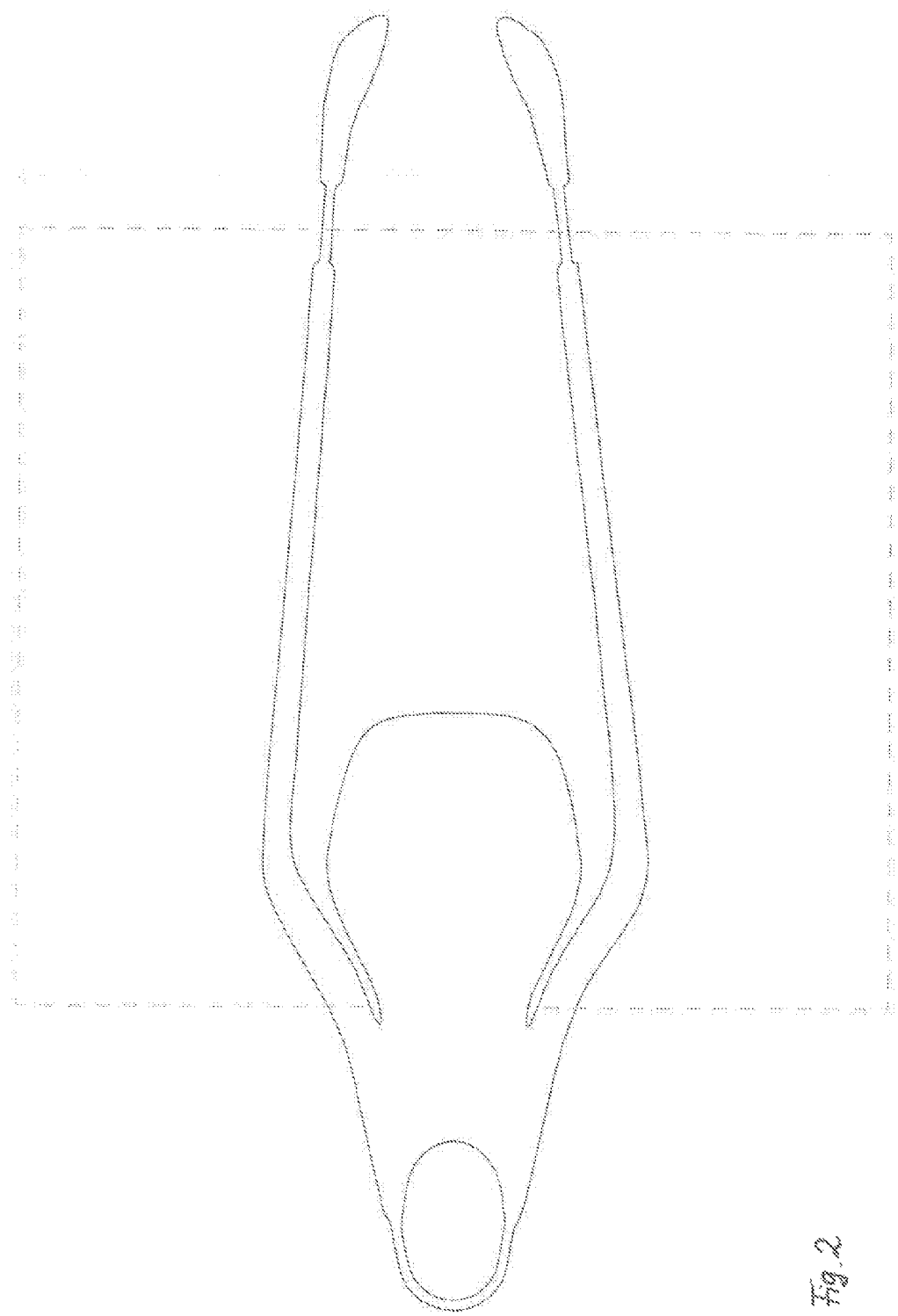
FIG. 2: top view of the splatter guard of FIG. 1 in a second functioning position.

Two functioning positions of the splatter guard in accordance with the disclosure that are shown in FIGS. 1 and 2 and FIGS. 3a and 3b are produced from this arrangement of the tongue 4 and its coupling with the two legs 2, 3. FIGS. 1 and 3a show the splatter guard in accordance with the disclosure in the first functioning position, and the two FIGS. 2 and 3b show the splatter guard in the second functioning position. In the first functioning position (FIGS. 1 and 3a), the two legs 2 and 3 are in a basic position in which they have a maximum distance from each another. This basic position is prespecified by the configuration of the arrangement of the two legs 2, 3 on the main body 7. In this first basic position of the splatter guard, the tongue 4 located between the two legs 2, 3 is located, at least approximately, in the plane of the two legs 2, 3, as can be seen from FIG. 3a. One can see from FIG. 3a that the two legs 2, 3 are thereby bent upward in the longitudinal direction. However, the legs 2, 3 can also be shaped straight (that is, without the bend in a longitudinal direction). In the first functioning position, the movable tongue 4 is adjacent to the main body, on a (perhaps also bent) plane with the two legs 2, 3, at least in the front section of the two legs 2, 3.

By pressing together the two legs 2, 3 against the restoring force that is produced by the elastic formation of the legs 2, 3, the splatter guard can be brought to the second functioning position, which is shown in FIGS. 2 and 3b. In this second functioning position, the two legs 2, 3 are pressed together, relative to one another, in particular, on their free ends 2a, 3a, and, in comparison to the first functioning position, have a smaller distance to one another. With a pressing together of the two legs 2, 3 to the second functioning position, the movable tongue 4 is raised and, in this way, is lifted out of the plane of the two legs 2, 3, as shown in FIG. 3b. In this second functioning position, the movable tongue 4 protrudes above the two legs 2, 3 at least partially, and in particular in its front section 4a, facing the free leg ends 2a, 3a.

In the second functioning position (FIG. 2 and FIG. 3b), a flat splatter guard element can be inserted between the raised tongue 4 and the two legs 2, 3. This is made possible in that with the pressing together of the two legs 2, 3 to the second functioning position and by the raising of the tongue 4 between the underside of the tongue 4 and the upper side of the two legs 2, 3, a clamping space is formed into which a flat splatter guard element 5 can be inserted. The flat splatter guard element 5 is appropriately a vapor-permeable cloth, such as a textile cloth, a paper towel, or a cellulose cloth, in particular, a tissue-paper towel. A vapor-permeable and simultaneously liquid- or grease-absorbent cloth is particularly appropriate here. The splatter guard element 5 is shown with broken lines in the figures.

If the lateral pressure is applied on the two legs 2, 3 (wherein the splatter guard element is moved back to its first functioning position (basic position)) after the insertion of a flat splatter guard element into the clamping space between the raised tongue 4 and the two legs 2, 3, the inserted splatter guard element 5 is clamped between the underside of the tongue 4 and the upper sides of the two legs 2, 3 in that the movable tongue 4 is lowered during the passage to the first functioning position (basic position) and in that way, the inserted splatter guard element 5 is clamped in (FIG. 3a).

Figure 3:
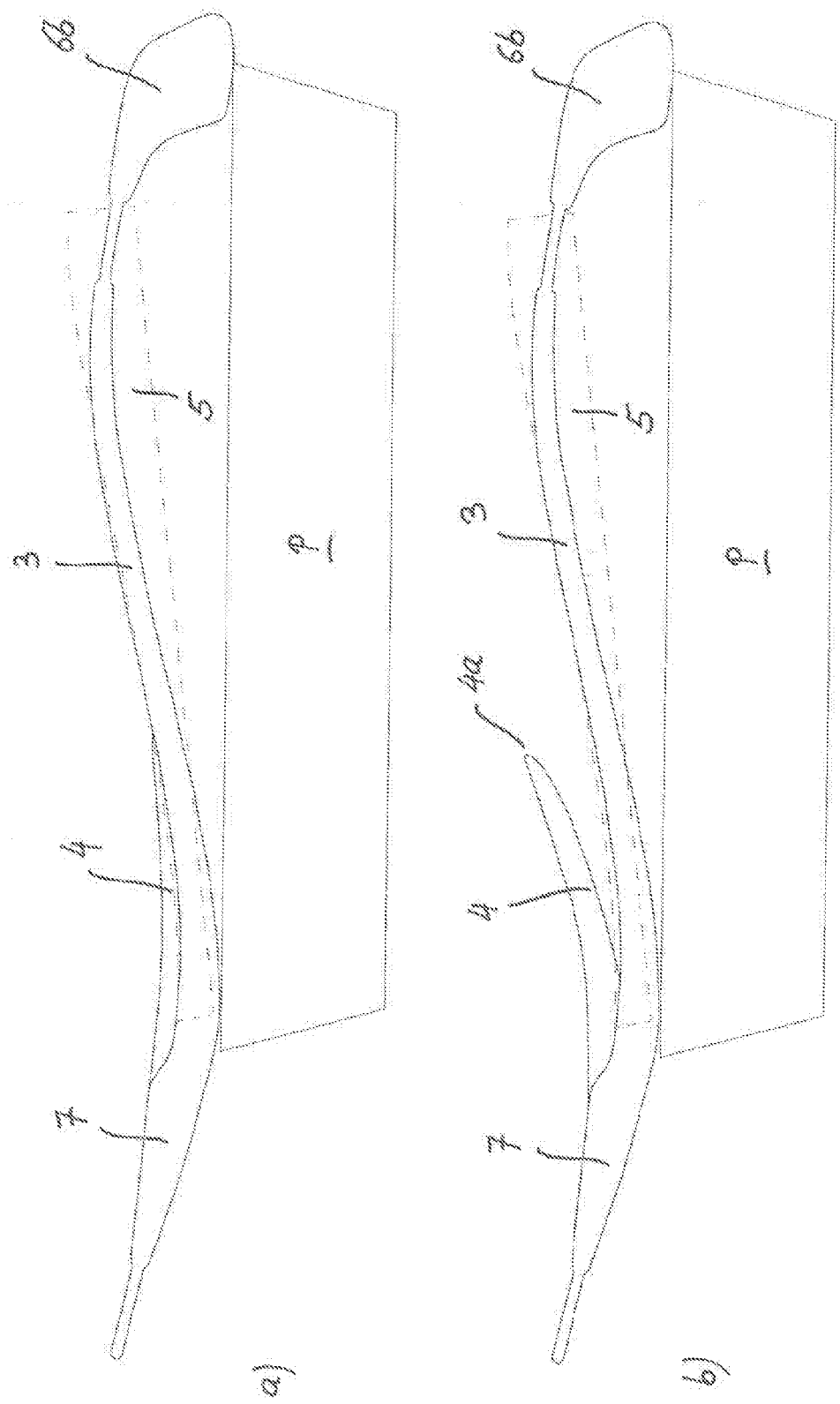
FIG. 3: side view of a pan with an applied splatter guard in accordance with the disclosure in a first functioning position of the splatter guard (FIG. 3a) and a second functioning position of the splatter guard (FIG. 3b), wherein the first functioning position corresponds to the functioning position of FIG. 1, and the second functioning position corresponds to the functioning position of FIG. 2.

The splatter guard with the splatter guard element 5 clamped therein can then be properly placed on a pot or a pan P, as shown in FIG. 3.

Appropriately, the two legs 2, 3 have an offset arm 6a, 6b on their free ends 2a, 3a. The lower end of the offset arm 6a, 6b is thereby used as a contact surface when placing the splatter guard on the edge of a pot or a pan P. Due to the curvature of the two legs 2, 3 in the longitudinal direction, a clearance is produced between the edge and the underside of the two legs 2, 3 in connection with the offset arms 6a, 6b with the placing of the splatter guard on the edge of a pot or a pan P. Rising vapors or grease spatters enter this free space during cooking or frying. The entering spatters are thereby retained by the splatter guard element 5 inserted into the splatter guard and cannot leave the gap between the edge of the pot or the pan P and the splatter guard placed thereon, because they are retained by the splatter guard element 5. Appropriately, liquid or grease spatters are absorbed by the liquid- and grease-absorbent splatter guard element 5. Gases and vapors, such as steam arising during cooking, can, on the other hand, flow out through the vapor-permeable splatter guard element 5.

After the cooking or frying process has ended, the inserted splatter guard element 5 can be removed from the splatter guard in a simple manner, in that the splatter guard is first removed from the pot or the pan P and, by means of the lateral pressure on the two legs 2, 3, is brought to its second functioning position (FIG. 3b), in which the movable tongue 4 is raised relative to the two legs 2, 3. In this way, the clamping space between the underside of the tongue 4 and the upper sides of the leg 2, 3 is again opened and the clamping of the inserted splatter guard element 5 is canceled, so that the splatter guard element 5 can be pulled out of the splatter guard. It is particularly appropriate thereby, for the removal of the splatter guard element 5 from the splatter guard, to hold it over a garbage can and by lateral pressure on the two legs 2, 3, to bring it to its second functioning position, so that the inserted splatter guard element 5 is disengaged between the tongue 4 and the two legs 2, 3 and can slide freely into the garbage can. This has the advantage that the user need not touch the possibly grease-soiled splatter guard element 5 in order to remove it from the splatter guard and to dispose of it.

The invention claimed is:

1. A splatter guard for preventing splattering of liquids from cooking appliances, the splatter guard comprising:
   a long-handled tongs having two legs, the two legs configured to be pressed together relative to one another in a closing direction of the long-handled tongs;
   a movable tongue arranged between the two legs, the movable tongue configured to be raised, relative to the two legs, in a direction perpendicular to the closing direction of the long-handled tongs when the two legs are pressed together relative to one another in the closing direction; and
   a flat splatter guard element clamped between the two legs and the movable tongue.

2. The splatter guard according to claim 1, wherein the cooking appliances are pots and pans.

3. The splatter guard according to claim 1, wherein when the two legs are pressed together, the movable tongue is positioned to protrude at least partially above the two legs.

4. The splatter guard according to claim 1, wherein the two legs span a plane and the movable tongue has an essentially flat shape.

5. The splatter guard according to claim 4, wherein when the splatter guard is positioned such that no force is being exerted on the two legs, the movable tongue is positioned in the plane spanned by the two legs.

6. The splatter guard according to claim 1, wherein the two legs are formed from an elastic material.

7. The splatter guard according to claim 1, wherein the two legs are configured to be pressed together against a resetting force.

8. The splatter guard according to claim 1, further comprising a clamping space formed between the two legs and the movable tongue when the two legs are pressed together.

9. The splatter guard according to claim 8, wherein the flat splatter guard element is a flat splatter guard tissue positioned and clamped in the clamping space.

10. The splatter guard according to claim 9, wherein the flat splatter guard tissue is positioned and clamped between an underside of the movable tongue and an upper side of the two legs.

11. The splatter guard according to claim 9, wherein the flat splatter guard tissue is selected from the group consisting of a vapor-permeable cloth, a textile cloth, a tissue paper, a cellulose cloth, and a tissue-paper towel.

12. The splatter guard according to claim 1, wherein each of the two legs is elongated and bent in a longitudinal direction.

13. The splatter guard according to claim 1, wherein each of the two legs has a free end.

14. The splatter guard according to claim 13, further comprising an offset arm arranged on each free end.

15. The splatter guard according to claim 1, wherein the splatter guard further comprises a main body on which the movable tongue is formed and the two legs are positioned.

16. The splatter guard according to claim 15, wherein each of the two legs is formed by a metal rod inserted into the main body.

17. The splatter guard according to claim 15, further comprising a handle formed on the main body.

18. A method for using a splatter guard to prevent splattering of liquids from a cooking appliance, the method comprising:
   providing a splatter guard comprising a long-handled tongs having two legs, the two legs configured to be pressed together relative to one another in a closing direction of the long-handled tongs; and a movable tongue arranged between the two legs, the movable tongue configured to be raised, relative to the two legs, in a direction perpendicular to the closing direction of the long-handled tongs when the two legs are pressed together relative to one another in the closing direction;
   pressing the two legs of the long-handled tongs together in a pressed-together position to raise the movable tongue;
   holding the two legs in the pressed together position;
   inserting a flat splatter guard tissue between the two legs and the raised movable tongue;
   releasing the two legs from the pressed-together position; and
   clamping the flat splatter guard tissue between the two legs and the movable tongue,
   wherein the flat splatter guard tissue covers an opening of the cooking appliance thereby preventing splattering of liquids from the cooking appliance.

19. A splatter guard for preventing splattering of liquids from cooking appliances, the splatter guard comprising:
   a long-handled tongs having two elongated legs, the two elongated legs configured to be pressed together relative to one another in a closing direction of the long-handled tongs;
   a movable tongue arranged between the two elongated legs, the movable tongue configured to be raised, relative to the elongated two legs, in a direction perpendicular to the closing direction of the long-handled tongs when the two elongated legs are pressed together relative to one another in the closing direction; and
   a flat splatter guard tissue positioned and clamped between an underside of the movable tongue and an upper side of the two elongated legs.

* * * * *